UNITED STATES PATENT OFFICE.

FRANCIS WRIGHT AND GEORGE W. WRIGHT, OF WASHINGTON, D. C.

LIQUID POND-LILY SOAP FOR TOILET PURPOSES.

SPECIFICATION forming part of Letters Patent No. 236,926, dated January 25, 1881.

Application filed June 12, 1879.

*To all whom it may concern:*

Be it known that we, FRANCIS WRIGHT and GEORGE W. WRIGHT, both of the city of Washington, in the District of Columbia, have invented certain new and useful Improvements in Liquid Pond-Lily Soap for Toilet Purposes; and we do hereby declare that the following is a full, clear, and exact description of the invention, which will enable others skilled in the art to which it appertains to make and use the same.

This invention relates to that class of compounds used for toilet purposes; and it consists in a composition for a toilet-wash composed of the extract from pond-lilies combined with a saponaceous base devoid of animal fats and animal oils, and with water, aqua-ammonia, borax, and bicarbonate of soda, in the proportions hereinafter described, the whole forming a liquid wash.

This composition is made by first forming a saponaceous base by mixing any one or more of the vegetable oils of olive, cotton-seed, earth-nut, or other oils extracted from oleaginous seeds, saponified with lyes of soda, and then adding an extract from the root and leaves, from either the root or the leaves, of pond-lilies and a perfume derived from the bloom of the pond-lily. Of the pond-lily family we prefer to use the extract and perfume of the white pond-lily, (*Nymphæa odorata*,) because of valuable healing qualities of this plant, especially for diseases and eruptions of the skin, and because of the delicacy and delightful odor of the perfume.

The saponaceous base may be prepared by taking, say, about three-fourths (¾) part of olive-oil and, say, about one-fourth (¼) part of oil derived from the cotton-seed or earth-nut, saponified by lyes of soda in manner similar to the processes used in the manufacture of soap, and known respectively as the "boiling process" and the "cold process." If made by the cold process, which requires less time than the boiling process, we use for every hundred pounds of oil, say, about fifty pounds of the lyes of soda, marking thirty-six degrees alkalimetric strength by Baumé's hydrometer. The oil is put into a kettle of sufficient capacity, holding, say, about forty-five or fifty gallons, and heat is applied until the temperature of the oil is raised to about 100° Fahrenheit; then the lyes of soda are gradually added and kept constantly stirred for two or three hours, or until the substances are completely united. The heat is kept at an even temperature of about 112° Fahrenheit, which is most favorable for the perfect saponification of the oil. The process of making the saponaceous base is complete when the oil and lyes of soda have combined into a homogeneous mass, having neither oil at the top nor lye at the bottom of the kettle. If made by the boiling process, we proceed substantially as in the ordinary soap manufacture. At this stage of the process we add to the weight of the saponaceous base about one per cent. of extract of pond-lilies and thoroughly mix until the extract is evenly incorporated; then pour this semi-fluid compound into suitable frames to gradually cool, and in a few days it will set or become hard.

From this compound we prepare a very desirable toilet-wash by the addition of a sufficient quantity of pure soft water to reduce the compound to a fluid condition, to which we add a saturation of borax and a mere trace of bicarbonate of soda, to combine the aqueous solution with the saponified base. We also add sufficient aqua-ammonia to preserve the toilet-wash for any length of time in any climate, and for its cooling, refreshing, and detersive qualities in connection with the other ingredients of the pond-lily toilet-wash.

In the manufacture of the pond-lily toilet-wash we use the several ingredients in substantially the following proportions, namely: four pounds of the toilet compound dissolved in ten gallons of water, to which is added one gallon of aqua-ammonia, twelve ounces of borax, and one ounce of bicarbonate of soda.

It will be observed from the preceding description that we avoid all animal fats or oils, and thus escape all possibility of animal odors in our wash, as well as all risk of communicating cutaneous or other diseases derivable from slaughtered animals.

It will also be observed that we secure all the advantages due to the healing qualities of the roots and leaves of the pond-lily, in addition to the mere delicacy of odor derived from the bloom of the plant.

We claim—

The toilet-wash described, the same consisting of the extract from pond-lilies, combined with a saponaceous base devoid of animal fats or oils, and with water, aqua-ammonia, borax, and bicarbonate of soda, in the proportions substantially as described.

FRANCIS WRIGHT.
GEORGE W. WRIGHT.

Witnesses:
C. E. TOWN,
W. P. MARSH.